UNITED STATES PATENT OFFICE.

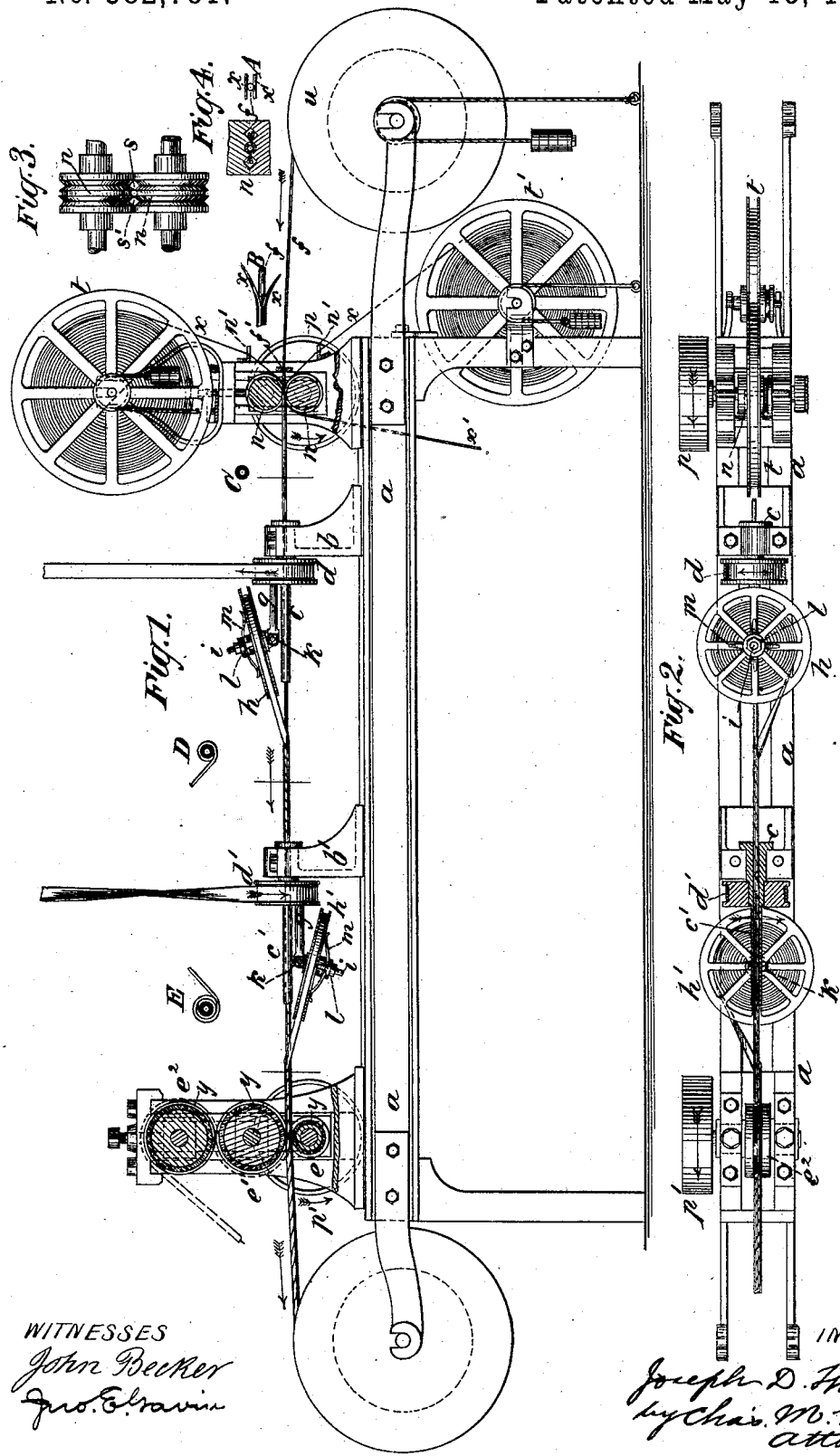

JOSEPH D. THOMAS, OF NEW YORK, N. Y.

INSULATED WIRE.

SPECIFICATION forming part of Letters Patent No. 382,781, dated May 15, 1888.

Application filed November 13, 1884. Renewed September 24, 1887. Serial No. 250,586. (No model.)

*To all whom it may concern:*

Be it known that I, JOSEPH D. THOMAS, of New York city, New York, have invented certain new and useful Improvements in Covered or Insulated Wires, of which the following is a specification.

A prominent feature of my invention consists in covering wire with two or more successive adherent strips or tapes wound on spirally, the second tape being wound at a reverse inclination to the first, so that the seams of one tape "break joints" with the other tape and lie at nearly right angles to each other, whereby a very strong and impervious covering is produced.

Another feature of my improvement consists in employing tapes or strips of fibrous material coated with soft rubber or equivalent material before they are applied to the wire, whereby the rubber-coated tapes, when wound about the wire, as described, adhere firmly to the wire and to each other, and when the covered wire is subsequently vulcanized these coatings become fixed thereon in a very firm and permanent manner, forming a perfect insulating and water-proof covering thereon, having great tenacity by reason of the spirally-overcrossing fibrous webs or tapes.

I prefer to saturate the first tape with a thin solution of vulcanizable rubber, and also to coat its inner face with a film of rubber, so as to form an adherent and insulating layer of rubber next to the metallic surface of the wire, while the outer surface of the same tape I provide with a thin film of rubber to better adhere to the second tape, which is wound over the first. This second tape I saturate like the first, and also provide it with a thin film of rubber on its inner surface to better adhere to the rubber film on the outer surface of the first tape, while I leave the outer surface of the second tape plain or free from plastic compound. I also prefer to prepare this outer tape by charging it with incombustible material, so as to be fire-proof and uninflammable, so that while the tape may be charred by contact with flame it will not catch fire or inflame.

The fibrous tapes or strips mentioned may be regularly-woven tapes of proper width, or may be made from any woven fabric cut into strips, or from felt or paper.

Instead of rubber, any equivalent plastic or insulating material may be used, but a soft vulcanizable rubber is much preferable, as described.

Instead of covering the naked wire directly with the two reversely-wound tapes, as described, the naked wire may first be coated with a covering of soft vulcanizable rubber, applied, preferably, in the form of two longitudinal strips, which are pressed and united around the wire by feed-rollers in the manner shown in my former patent, No. 271,750, of 1883. I generally prefer to employ this triple coating; but the first rubber coat may be omitted without departing from the most essential features of my present system.

The mechanism employed for covering the wire according to the above system is shown in the drawings annexed, as will be now described.

Figure 1 of the drawings gives a longitudinal or side elevation of my improved machine, and Fig. 2 a plan view thereof. Fig. 3 is a front elevation of the first feed-rollers which apply the preliminary soft-rubber coat, and Fig. 4 is a section of the rollers at their junction. A gives an end view of the wire and the rubber strips previous to entering the first rollers. B represents an enlarged side view of the wire when passing between the first rollers, with the rubber strips applied thereto. C represents a cross-section of the wire after receiving the rubber coat. D is a cross-section after receiving the first tape, and E a cross-section after receiving the second tape.

In the drawings, $a\ a$ indicate the bed or table of the machine, at the front end of which is arranged the first set of feed-rollers, $n\ n$, which may be adapted to simply seize the naked wire and force it into the machine, or to apply the preliminary rubber coat thereto and feed in the wire at the same time, the latter being assumed in this case and fully shown in the drawings.

At the rear end of the machine is placed the second or main set of feed-rollers, $e\ e'\ e^2$, which act to pull the wire through the machine and perform the most positive feeding action on the wire. The rollers of both sets are of course positively geared together and mounted in adjustable bearings in the manner usual with rollers, and each set is also provided with driving-pulleys $p\ p'$, preferably of similar size, to receive driving-belts, whereby power is imparted to simultaneously revolve the rollers, which should rotate at similar speeds. The pulleys $p\ p'$ may be changed and varied in size when different speeds are required for different sizes of wire, as will be readily understood.

Behind the first rollers $n\ n$ a fixed upright stock or bearing, $b$, arises from the table of the machine, and in this bearing is journaled a hollow rotary spindle, $c$, provided with a pulley, $d$, to receive a belt, whereby the spindle may be rapidly revolved, as indicated. At about the middle of the table, in front of the main feed-rollers $e\ e$, is mounted a second upright, $b'$, with a hollow rotary spindle, $c'$, and pulley $d'$, similar to the first set. The bores of the hollow spindles $c\ c'$ are in line with each other and with the junction-line of the feed-rollers $n$ and the lower pair of feed-rollers, $e\ e$, so that a naked wire, $f$, may be passed centrally through each of the spindles and grasped between the feed-rollers, which being set in motion will draw the wire at any desired speed through the spindles while the spindles are revolved about the wires. From the pulley of each spindle an arm, $g$, projects, on the end of which is sustained a bobbin, $h\ h$, which contains coils of tape prepared as before described. The axes $i$ of the bobbins are jointed to the end of the arms $g$, and are provided with clamp-nuts $k$, whereby the bobbins may be set at the proper inclination to the wire, as will be understood from the drawings. A proper frictional tension may be put upon the bobbins by the thumb-nuts $l\ l$, which will press the friction-springs $m\ m$ against the upper side of the bobbins, as will be understood.

Where the first rollers $n\ n$ are employed to apply the preliminary rubber coat to the naked wire, the rollers will be formed as shown in Fig. 3, with forming-grooves $r$ adapted to the size of the wire with its rubber coat, said grooves having knife-like or cutting edges $s$, while relief-grooves $s'$ are formed on either side of the knife-edges. These knife-edges and relief-grooves are shown in my former patent and no novelty is therefore claimed therein.

Above and below the rollers $n$ is mounted a large bobbin, $t\ t'$, on which is wound the soft-rubber strips $x\ x$ to be applied to the wire, said bobbins having a grooved hub over which a weighted cord passes, as shown, to keep a proper brake or tension on the bobbin, which tension may, however, be effected in any other suitable way. The naked wire $f$ passes from the reel $u$, on which a suitable tension is maintained similar to that on the bobbins $t$, as illustrated, and the wire in being led from the reel passes first through a guide or draw plate, $f''$, and thence enters the grasp of the rollers $n\ n$ between the grooves $r$. Simultaneously the rubber strips $x\ x$ are led from the bobbins $t\ t'$ over guide-plates $n'\ n'$, and thence enter the grasp of the rollers above and below the wire and between the grooves $r$ and the knife-edges of the rollers.

Referring now to Fig. 4 and A, it will be seen that the width of the rubber strips $x\ x$ are each greatly in excess of the semi-circumference of the wire. Consequently when the wires and the strips are passed between the rollers, the forming-grooves $r$ will compress the strips firmly around the wire, while the cutting-edges will cut off the excess on each side, which excess will readily escape into the relief-grooves and will be delivered from the periphery of the lower roller, as shown at $x'$ in Fig. 1, these cuttings $x'$ being guided off by an attendant and allowed to accumulate on the floor or in a receptacle thereon, as will be understood. The strips being soft and unvulcanized will unite perfectly when pressed around the wire, as shown at B and C, and form a uniform circular coating about the wire, as seen best at C. The rollers $n$ may be heated to promote the union of the rubber strips at their jointure, if desired.

In my former patent the rubber strips were shown as about equal to or slightly greater than the semi-circumference of the wire, whereas in the present case they are greatly in excess of the measure of the wire. By this means a surplus of strength and material is obtained in the strips, which enable them to resist the tension of the rollers, and thus prevent the strips from stretching longitudinally and contracting laterally, and thus failing to properly encircle the wire, as is likely to occur where the strips are not of excessive width, whereas in the present case the strips are forced to encircle the wire solidly and with great perfection of circular form, as will be readily appreciated. The large cuttings $x'$, which this system requires to be removed, cause no waste, as they, being soft and unvulcanized, may be worked up and used over again.

It will be seen by reference to the drawings that the two bobbins $h\ h$ are set at opposite inclinations, and that the two spindles and bobbins are revolved in opposite directions, and that after the wire passes from the rollers $n$ and receives its preliminary rubber coating, it then passes though the spindles $c\ c'$ and between the main feed-roller $e\ e'$. The ends of the tapes on the two bobbins $h\ h$ being now fastened to the wire and the bobbins set at the proper angle and adjusted to the proper tension, the motion of the machine is continued by revolving the pulleys $p\ p'$ and $d\ d'$ in the directions indicated. The wire will therefore advance through the machine and will receive at first the preliminary coating of rubber at the rollers $n\ n$, as before described, and immediately after will receive a spiral wrapping of tape from the first bobbin $h$, which will be wound about the wire in one direction, and immediately succeeding this a second coat of tape will be wrapped spirally over the first in an opposite direction from the second bobbin $h'$. The speed of the feed-rollers $e$ with relation to the revolution of the spindles $c\ c'$ will determine the lay of the spiral windings of tape, which are preferably wound so that the edges overlap, as will be understood.

The tape on the first bobbin $h$ is saturated with a rubber solution, as before described, and is also coated with a film of soft rubber on its inner side, which will therefore cause the tape to adhere firmly to the rubber coating of the wire or to the naked surface of the wire, as the case may be, when wound about the same, and will also cause the overlapping spiral joints of the tape to adhere firmly, and thus cause the tape to lie smooth and adherent as fast as it is wound on, as will be readily understood. The second tape from the bobbin $h'$ is prepared with a film of rubber on its inner face to adhere to the exterior of the first tape, and is preferably coated or saturated on its exterior with a fire-proofing compound, as before described, so as to render the exterior of the finished wire fire-proof, as before specified.

Where the wire is very thick, it is passed between the lower feed-rollers, $e\ e'$; but ordinary sizes of wire are passed in a zigzag returning-curve between and around the series of rollers and around the top of the upper roller, as indicated by dotted lines in Fig. 1. This enables a better grasp to be obtained on the wire, and also acts as a straightening device to remove all kinks from the wire and to deliver the wire straight upon the winding-drum $w$, on which the covered wire is accumulated, as will be understood.

After the drum $w$ is filled it is removed to the kilns and subjected to the vulcanizing-heat, which fixes the rubber and causes the different layers to become intimately bound together about the wire, as will be readily appreciated.

It will therefore be seen that the product of this system will be a most effectively insulated and protected wire having a triple coat of insulating and protecting layers. The first or rubber coat makes perfect contact with the wire and gives a perfect insulated and waterproof quality, while the two outer layers of tape oppositely wound add greatly to the insulating and impervious qualities and protects the inner rubber layer and renders the entire coating exceedingly strong and flexible and very durable. As before stated, the inner rubber coat may be omitted and two or more of the tape-windings in reverse directions employed instead. In this case the rubber films of the tapes might be a little thicker than where the preliminary rubber coat is used. This would produce an excellent coating, less expensive than the other, and fully as well adapted for a great variety of uses. Where, however, a superior degree of insulation is desired, I prefer to employ the first rubber coat in connection with the two opposite tape windings, as described.

The feed-rollers $e$ are preferably made with a steel shaft, a wooden hub, and an elastic or yielding periphery formed of vulcanized rubber partly grooved, as indicated at $y$ in the drawings, thereby forming an elastic grasping-surface to seize the wire with a frictional grasp, so that the wire partially embeds itself in the surface of the rollers, and is grasped in a firm yet elastic manner, which does not injure or displace the coatings of tape in passing between the rollers.

Where it is desired to apply more than two successively-wound coatings to the wire, the number of successively-arranged bobbins and spindles may of course be increased without any change in the principle or action of the machine.

I have made the machines substantially as herein shown the subject of a special application for patent, filed August 20, 1887, No. 247,417.

I limit my claims in this application to the improved covered wire or product described, having reserved my right to the machine or other novel features shown for the subjects of separate applications.

What I claim as my invention, and desire to protect by this patent, is as follows:

1. Wire insulated or covered with a fibrous strip or tape coated with soft unvulcanized rubber wound spirally about the wire and subsequently vulcanized thereon.

2. Wire insulated or covered with two successive tapes wound successively about the wire, the first tape being provided with adherent insulating material to adhere to the wire, while the second tape is prepared with a dry and non-adherent exterior.

3. Wire insulated or covered with two tapes or strips wound successively thereon, the first tape being of insulating and adherent material, while the outer tape is non-inflammable with a dry and non-adherent exterior, substantially as herein set forth.

4. Wire insulated or covered with two longitudinal strips of soft insulating material united diametrically about the wire, in combination with two overlying strips or tapes wound spirally thereon in successive layers and in opposite directions, substantially as herein shown and described.

5. The method of covering wire with a triple coating herein described, consisting in first applying a soft rubber coat to the naked wire, and thence winding over said coat two successive spiral windings of tape, each wound in opposite directions, substantially as herein set forth.

JOSEPH D. THOMAS.

Witnesses:
CHAS. M. HIGGINS,
JNO. E. GAVIN.